United States Patent
Tye et al.

(10) Patent No.: US 10,289,369 B2
(45) Date of Patent: May 14, 2019

(54) MANAGING PRINT JOBS USING PEER-TO-PEER TECHNIQUES

(71) Applicant: Dell Products, L.P., Round Rock, TX (US)

(72) Inventors: Bee June Tye, Singapore (SG); Chee Wei Lok, Singapore (SG); Manish K. Desai, Singapore (SG)

(73) Assignee: Dell Products, L.P., Round Rock, TX (US)

( * ) Notice: Subject to any disclaimer, the term of this patent is extended or adjusted under 35 U.S.C. 154(b) by 155 days.

(21) Appl. No.: 15/335,487

(22) Filed: Oct. 27, 2016

(65) Prior Publication Data

US 2018/0121148 A1    May 3, 2018

(51) Int. Cl.
*G06F 3/12* (2006.01)

(52) U.S. Cl.
CPC .......... *G06F 3/1291* (2013.01); *G06F 3/1222* (2013.01); *G06F 3/1261* (2013.01); *G06F 3/1267* (2013.01); *G06F 3/1285* (2013.01); *H04N 2201/0094* (2013.01)

(58) Field of Classification Search
None
See application file for complete search history.

(56) References Cited

U.S. PATENT DOCUMENTS

| | | | | | |
|---|---|---|---|---|---|
| 4,949,337 | A * | 8/1990 | Aggers | ................. | H04L 12/417 370/451 |
| 2002/0093675 | A1 * | 7/2002 | Matsuda | ............ | H04N 1/00432 358/1.15 |
| 2004/0252331 | A1 * | 12/2004 | Wei | ......................... | H04L 67/02 358/1.15 |
| 2006/0082816 | A1 * | 4/2006 | Daniel | ............... | H04N 1/00204 358/1.15 |
| 2007/0273925 | A1 * | 11/2007 | Hong | ..................... | G06F 3/1204 358/1.16 |
| 2008/0253667 | A1 * | 10/2008 | Shiraishi | ............... | G06F 3/1204 382/232 |
| 2009/0165012 | A1 * | 6/2009 | Corona | .................. | G06F 9/5044 718/105 |
| 2011/0014984 | A1 * | 1/2011 | Penman | .................. | A63F 13/71 463/42 |
| 2014/0214939 | A1 * | 7/2014 | Tallinger | ............... | G06F 3/1218 709/204 |
| 2016/0054961 | A1 * | 2/2016 | Asthana | ................ | G06F 3/1203 358/1.15 |
| 2016/0085486 | A1 * | 3/2016 | Yokozawa | ............ | G06F 3/1212 358/1.13 |
| 2016/0364193 | A1 * | 12/2016 | Yu | ......................... | G06F 3/1241 |

* cited by examiner

*Primary Examiner* — Neil R McLean
*Assistant Examiner* — Pawan Dhingra
(74) *Attorney, Agent, or Firm* — Fogarty LLP

(57) ABSTRACT

Systems and methods for providing multi-parameter current sharing are described. In some embodiments, a printer may include a processor and a memory coupled to the processor, the memory having program instructions stored thereon that, upon execution by the processor, cause the printer to: assume master status; receive a first peer list from a first peer printer; create an updated peer list, where the updated peer list lists the printer; send the updated peer list to the first peer printer; receive confirmation that the updated peer list was accepted by the first peer printer; and release master status.

19 Claims, 4 Drawing Sheets

MANAGING PRINT JOBS USING PEER-TO-PEER TECHNIQUES

FIELD

This disclosure relates generally to Information Handling Systems (IHSs), and more specifically, to systems and methods for managing print jobs using peer-to-peer techniques.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

In many implementations, an IHS may include or be coupled to a printer. Generally speaking, a printer is a peripheral which imprints graphics or text on paper. Common printer mechanisms include color, black and white laser or LED printers, and color inkjet printers. Less common but also available are 3D printers, which allow the creation of physical objects with relatively little effort on the part of an end-user.

In some implementations, "Secure Print" may be used as a mechanism to enable a user to send documents directly to a given printer, such that those documents are printed only when that user enters their Personal Identification Number (PIN) number into the given printer (or remotely via a desktop or mobile device, for example, using a printer application). Secure Print is designed to avoid exposing sensitive printouts to other people who also have access to the same printer(s) and to prevent printouts left over on the printers where the senders forget to pick up after sending the job.

To use Secure Print, a Print Server (a dedicated IHS separate from the printer(s)) holds jobs that are then released by the user either via user authentication at the printer, depending on the configuration. Pulling jobs from a Print Server while at the printer is called "Pull Printing." When the Print Server is absent, jobs are held on the printer's memory where the job is sent to, and printing is delayed until the owner is physically at the same printer to enter the PIN to release the job. The number of jobs held on the printer depend upon the storage capacity of that individual printer.

The inventors hereof have recognized, however, that Secure Print and Pull Printing solutions tend to be complex, costly, and therefore unavailable to many users, particularly in the small and medium-sized business (SMB) environment.

Among the various issues with existing technologies, the inventors hereof have recognized, for example: (a) the lack of Print Servers to enable Pull Printing as certain classes of customers are usually cost sensitive and cannot invest in server-based enterprise solutions, (b) the number of jobs hold on a given printer depends on the storage capacity (printer memory allocated to hold jobs) of that printer, (c) when the storage is insufficient, a user has to manually resend the secure job to another printer, (d) when the printer holding the secured print job is in error or running out of toner, the user cannot release the job from another nearby printer, etc.

To address these, and other concerns, the inventors hereof have developed systems and methods for managing print jobs using peer-to-peer techniques, as described herein.

SUMMARY

Embodiments of systems and methods for managing print jobs using peer-to-peer techniques are described herein. In an illustrative, non-limiting embodiment, a printer may include a processor and a memory coupled to the processor, the memory having program instructions stored thereon that, upon execution by the processor, cause the printer to: assume master status; receive a first peer list from a first peer printer; create an updated peer list, where the updated peer list lists the printer; send the updated peer list to the first peer printer; receive confirmation that the updated peer list was accepted by the first peer printer; and release master status.

In some cases, the send and receive operations may be performed over a peer-to-peer network made exclusively of printers, and the peer list may include a list of all other printers in the peer-to-peer network. To assume master status, the program instructions, upon execution, may further cause the printer to: determine whether the first peer printer has master status; and assume master status, at least in part, in response to the first peer printer not having master status.

The printer may be configured to receive a second peer list from a second peer printer, select a most recent peer list, and create the updated peer list by adding the printer to the most recent peer list. The printer may also select the most recent peer list by comparing a first time stamp associated with the first peer list against a second time stamp associated with the second peer list, such that creating the updated peer list includes adding a time stamp to the updated peer list.

The printer may be further configured to maintain a local job list including a print job stored locally in the printer, maintain a remote job list including print jobs stored locally in other peer printers, receive a copy of a first local job list from the first peer printer, wherein the first local job list includes a print job stored locally in the first peer printer, and update the remote job list with the given print job from the first job list.

In response to running out of available memory for an additional print job, the printer may directly send the additional print job to a selected one of the first and second peer printers in the absence of any involvement by any print server.

Moreover, to select between the first and second peer printers, the program instructions, upon execution, may cause the printer to determine which of the first or second peer printer has more available memory. To determine which of the first or second peer printer has more available memory, the printer may determine the available memory of each peer printer based upon the remote job list. Additionally or alternatively, to determine which of the first or second peer printer has more available memory, the printer may send an inquiry to each peer printer.

In some cases, the printer may receive an additional print job having a particular characteristic, autonomously select a most used peer printer for the particular characteristic in the absence of user selection, and offload the additional print job to the most used peer printer prior to running out of available memory. For example, the characteristic may be selected from the group consisting of: a physical location relative to a user, a minimum number of pages for a single document, a maximum number of pages for a single document, a color document, and a grayscale document.

The sending, receiving, creating, sending, receiving, and releasing may take place upon the printer entering a peer-to-peer mode and the program instructions, upon execution, cause the printer to enter the peer-to-peer mode in response to a print server going offline. Also, the program instructions, upon execution, may cause the printer to leave the peer-to-peer mode in response to the print server going online.

In another illustrative, non-limiting embodiment, a method may implement one or more of the aforementioned operations. In yet another illustrative, non-limiting embodiment, a memory device may have program instructions stored thereon that, upon execution by a printer, cause the printer to perform one or more of the aforementioned operations.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Figure 1:
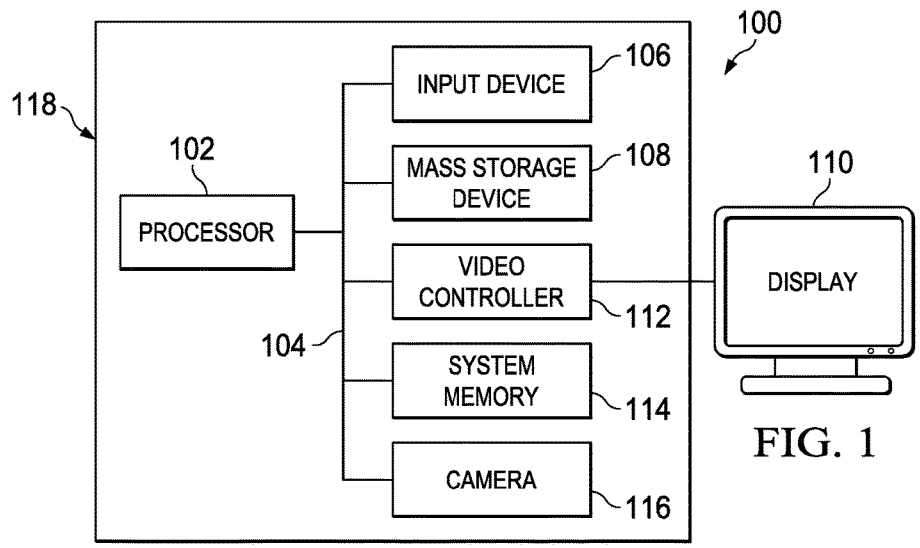
FIG. 1 is a diagram of an example of an IHS configured to implement systems and methods described herein.

Systems and methods for managing print jobs using peer-to-peer (P2P) techniques are described herein. In some embodiments, these techniques may enable, for example: (a) follow-me printing without a print server, (b) printers with P2P framework with no setup required, (c) removing setup complexity from the user, (d) printers with P2P framework capability that can leverage peer storage capacity and route jobs to peers when required, etc. In many cases, for example, job storage may be increased proportionally with the number of printers in a network.

Particularly, systems and methods described herein provide a methodology based on P2P technologies to address some or all of above mentioned concerns and to provide value-added solutions that are particularly well-suited, for example, to small and medium sized-businesses.

In some implementations, printers with P2P capabilities described herein may auto-create and synchronize peer lists, self-manage jobs stored locally, and send the job lists to peers. Users can send secured jobs to any network printer, and can release a job from the same or another printer using a personal identification number (PIN), bar code, NFID, etc. When user sends a secure job to a printer that is run out of storage to hold the job, the printer will route the job to a peer printer with available storage to store the job. This process may be transparent to the user. When a user releases the job from the printer, and the printer is in error, user is able to release the job from another printer nearby.

In various embodiments, systems and methods described many herein require little or no additional hardware. On average, existing printers are able to hold up to 20 print jobs (assuming 5 pages per job). These techniques increase storage capacity virtually—that is, when there are 3 printers, for example, each printer can support up to 60 print jobs.

These concepts apply equally to both mono and color printers, multi-functional, all-in-one (AIO), and single function (SFP) printers. For example, when a user has both types of printers, the job list may indicate color/mono job types. If user is sending a color job and walks up to a mono printer, the user has an option to release the job as grayscale printout or walk up to a peer color MFP nearby to release the job.

Most specifically, from the user's perspective, there is no additional setup required to setup the pull printing or follow-me printing solutions. When more than one printer in the P2P framework capability is connected to the network, each of the printers may implement one or more (or all) of the following rules:

(1) establish a P2P printer network (P2PN) and create a peer-list that contains the printers joining the P2PN as members. The printer MAC address may be used as a universal unique identifier (UUID) to identify the printer, and a time stamp is used to identify the newest peer-list and to resolve conflicts.

(2) To join or update a peer-list, a printer announces itself as (or with) a token. Only one token is in the network at any one time.

(3) When there is a new printer, or an existing printer is powered on, it is responsible to determine that its peer-list stored locally is updated and in sync with the peers.

(4) Each printer manages its own jobs stored locally. When there is a new job added or released from the printer, that printer updates the local job list and sends the updated list to the peers in the peer list.

(5) Both the peer list and the job list may use a JavaScript Object Notation (JSON) data structure. An example of a job list data structure is as follows:

```
{"srcPrinter":"PrinterA_macAddress", "PrinterIP":"xx.xx.xx.xx",
"timestamp": yymmddhhmmss,
"joblist":[
{"jobID": "Pid_1", "jobName": "Sales brochure.ppt", "userID": "Alice"},
{"jobID": "Pid_2", "jobName": "template.doc", "userID": "John"},
{"jobID": "Pid_3", "jobName": "H625 user guide.pdf", "userID": "John"} ]
}
```

Moreover, examples of the underlying design logic to create a peer lists and synchronize the lists in a peer network may be as follows:

When a new printer is setup in the environment: (1.1) printer first setup (out-of-box), user follows instruction on operational panel to setup the printer; (1.2) the initial setup includes country, language, time and followed by the printer initialization and network setup (e.g., Ethernet or wireless); (1.3) a printer added to the network successfully; (1.4) the printer starts the peer-to-peer framework setup and announces itself as a token (or source printer initiating m2mEvent); (1.5) the token printer searches for the peer on the network, if no peer is found, it creates the first peer list, join the list and set the time stamp, then releases the token and entering m2mReady mode, listening to any m2mEvents.

When another new printer joins the network, the new printer goes through step (1.1) through (1.3) above. When the peer-to-peer framework starts: (2.1) the new printer searches for active token; (2.2) if no active token, it announces itself as token and gains the token, starts searching the network for peer printers, and proceeds to (3); but (2.1) if there is an active token, wait for time-out and repeat (2.3).

Peer-list synchronization action by virtual-master: (3.1) printer with token queries the peer-list; (3.2) m2mReady printers listening to m2mEvents respond with peer-list stored locally; (3.3) token printer compares all the list (if more than 1 list) received; (3.3.1). If all the list received including the token local copy are synchronized, no update is required, releases the token; (3.3.2). If all the list received are synchronized and token already a member in the list, but the local list is out of sync, update the local copy, releases the token; (3.3.3) if the lists received are out of sync, token looks for the list with the latest time stamp, join the list if it is not a member, update the local list and send the updated list to the peers on the network; (3.4) when token sends the updated list to all the peer printers, it requests acknowledgement; (3.5) peer printers receiving the updated list will validate the list to ensure itself remains in the list and then update the local list.

Response with acknowledgement: If any of the peer printer found itself being dropped out of the list during peer-list update process, it may attempt to become gain access to the token (2.3) and start the peer-list synchronization process.

Alive process: All peer devices may send alive message periodically (factory default: daily at off-peak, this parameter is configurable), to ping peers for their existence. When a user access a peer to peer job release, printer sends alive message to query for printer online status, and shows the job list on the printer's operational panel, grayed out if the peer printer is offline.

Synchronizing jobs list in the peer network after the peer-list is established: Every peer printer maintains two job lists, the job list capturing all the jobs stored locally, and a peer-job-list consolidating all the jobs stored on peer printers. A new secured job is received by any of the peer printer (source) joining the peer-list. The source stored the job locally. The source updates the local job list and send the updated list to peers on the peer list. Peer printers on the peer-list updated the peer-job-list (only the source printer section) with the updated list. If the source is running out of storage space, it looks for peers in the peer-list and negotiate to route the job to the peer to hold the job on a peer printer.

When a user walks up to any of the printers, the user accesses the secure job feature to view all the jobs. The user then selects his/her job from the list. If the selected job is stored locally, the printer prompts the user for user PIN which, if matching, allows the printer to perform the job and print on that printer. When the job is printed successfully, the job is removed from local storage, the printer updates the job list, and it sends the updated job list to peers on peer-list.

If the selected job is stored on a remote printer (another peer printer), the printer requests peer to transfer the selected job, prompts user for PIN. If matching, the printer processes the job and prints on the printer. Upon successfully printing the job, the printer may inform the source printer to remove the job from the storage.

For purposes of this disclosure, an Information Handling System (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

FIG. 1 is a block diagram of an example of IHS configured to implement systems and methods described herein. In various embodiments, IHS 100 may be implemented with a printer or printing device. As illustrated in this example, IHS 100 includes processor 102, which is connected to bus 104. Bus 104 serves as a connection between processor 102 and other components of IHS 100.

Input device 106 is coupled to processor 102 to provide input to processor 102. Examples of input devices may include keyboards, touchscreens, pointing devices such as mouses, trackballs, and trackpads, and/or a variety of other input devices known. Programs and data are stored on mass storage or memory device 108, which is coupled to processor 102. Examples of mass storage devices may include hard discs, optical disks, magneto-optical discs, solid-state storage devices, and/or a variety other mass storage devices.

IHS 100 further includes display 110, which is coupled to processor 102 by video controller 112. System memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices. Camera 116 is coupled to the processor to provide images and/or video to components of the IHS 100.

In an embodiment, chassis 118 houses some or all of the components of IHS 100. It should be understood that other buses and intermediate circuits can be deployed between the components described above and processor 102 to facilitate interconnection between the components and the processor 102.

Figure 2:
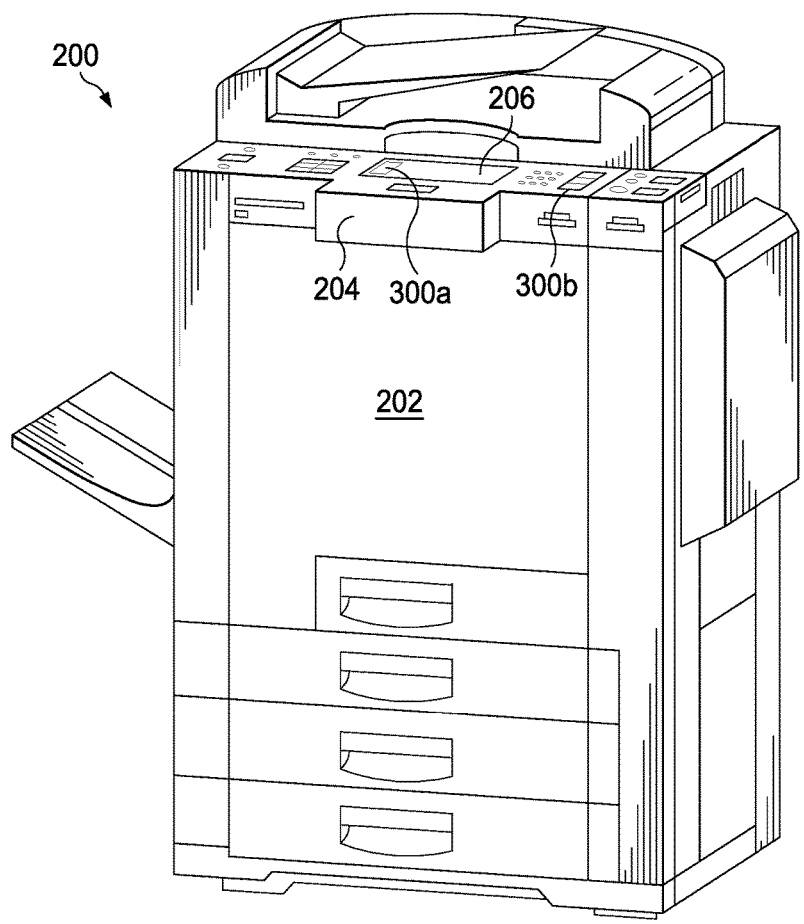
FIG. 2 is a diagram of an example of a printer configured to implement systems and methods described herein.

Referring now to FIG. 2, printer 200 is illustrated. Printer 200 includes base 202 having control panel 204 that includes electronic display 206. In an embodiment, printer 200 may be (or may include) IHS 100 discussed above with reference to FIG. 1, and/or may include some (or all) of the components of the IHS 100. In an embodiment, printer 200 is a networkable printer that includes hardware for coupling the printer to one or more IHSs through a network, and printer 200 is operable to print to a printing medium (e.g., paper that is stored in the printer 200 illustrated in FIG. 2), copy documents, fax documents, and/or perform a variety of other printer functions. Additionally or alternatively, printer 200 may be a 3-D printer or the like. Moreover, electronic display 206 may be a conventional electronic display, an electronic-paper (e.g., e-ink, etc.) display, and/or a variety of other displays.

Figure 3:
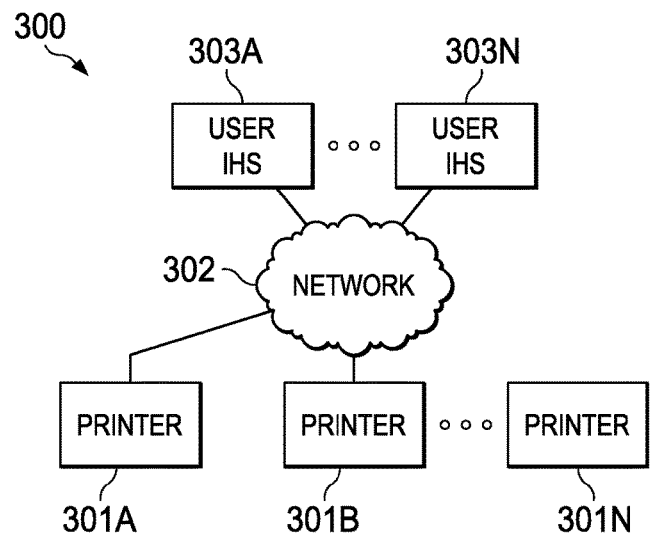
FIG. 3 is a diagram of an example of a printer network system configured to implement systems and methods described herein.

FIG. 3 is a diagram of an example of printer network 300 configured to implement systems and methods described herein. The networked system includes one or more user IHSs 303A-N, each of which may be (or may include) the IHS 100 described above with reference to FIG. 1. The one or more user IHSs 303 are coupled to network 302 which is coupled to one or more printers 301A-N, each which may be substantially similar to printer 200 described above with reference to FIG. 2. In the embodiment described below, network 302 is an intranet or other Local Area Network (LAN). However, the network 302 may a variety of networks known in the art without departing from the scope of the present disclosure.

Figure 4:
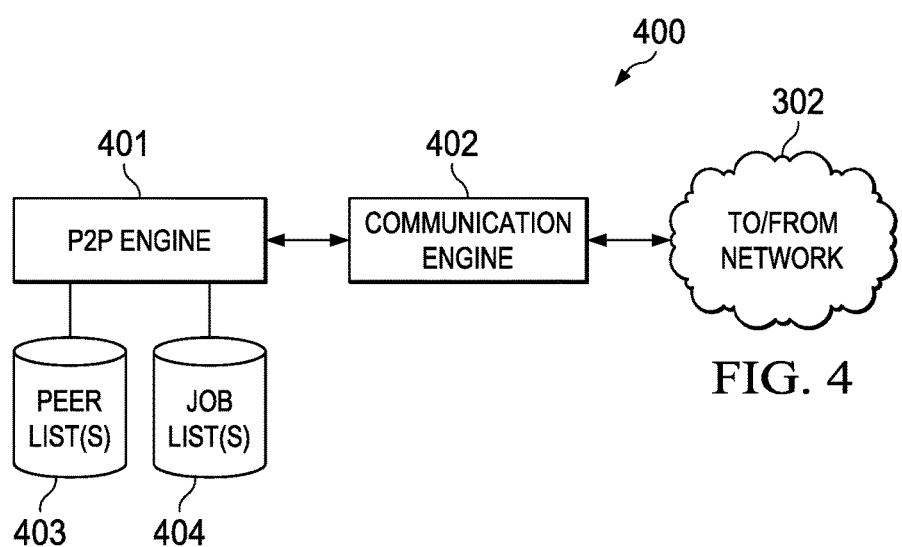
FIG. 4 is diagram of an example of a system for managing print jobs using peer-to-peer techniques according to some embodiments.

FIG. 4 is diagram of an example of system 400 for managing print jobs using peer-to-peer techniques according to some embodiments. In various embodiments, different instances of system 400 may be implemented by any given one of printers 301 in FIG. 3. In some embodiments, components 401-404 of system 400 may include data or program instructions stored on a physical memory device that, when executed by a processor (e.g., processor 102), execute one or more of the various techniques described herein.

As illustrated, P2P engine 401 is a component of system 400 responsible for performing print job management and other P2P operations. To that end, P2P engine 401 is coupled to communication engine 402, which enables communications with other printers and/or other IHSs having their own instances of system 400 over network 302. Peer list(s) 403 and/or job list(s) may be implemented as databases or other suitable type of electronic file. Operation of components 401-404 is detailed below with respect to FIGS. 5 and 6.

Figure 5:
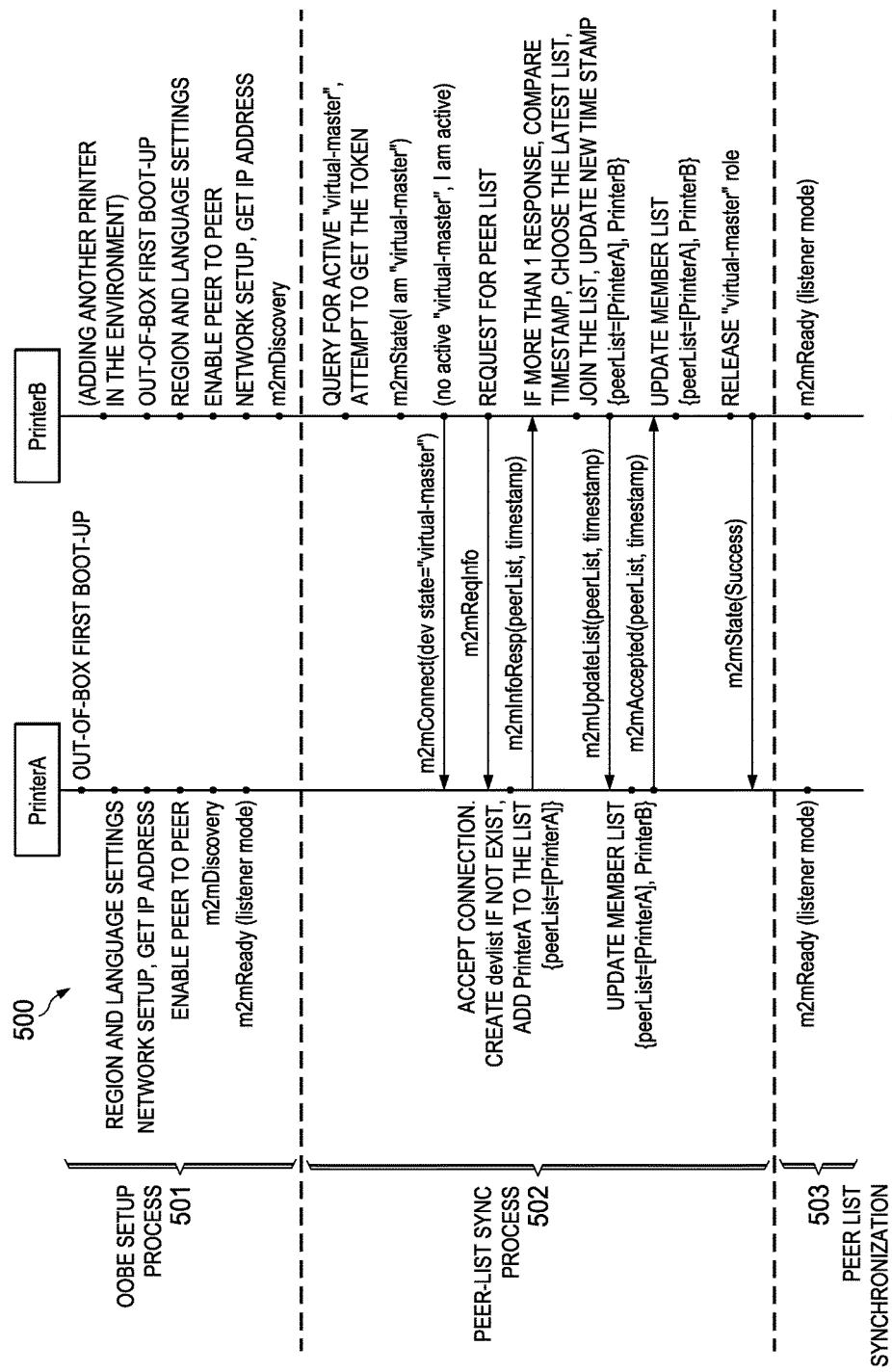
FIG. 5 is a diagram of an example of a method for peer list creation and synchronization according to some embodiments.

Particularly, FIG. 5 is a diagram of an example of method 500 for peer list creation and synchronization according to some embodiments. As shown, method 500 includes an Out-of-the-Box (OOBE) setup process 501, peer list synchronization process 502, and peer list synchronization 503.

During OOBE setup process 501, printer A (e.g., printer 301A) is introduced, boots up, and receives region and language settings, network setup, IP address, etc. It also executes an instance of P2P engine 401, enables machine-to-machine (m2m) discovery, and enters "m2mReady" or listener mode. Still during OOBE setup process 501, now printer B (e.g., printer 301B) is added to the environment, boots up, and receives its own region and language settings, network setup, IP address, etc. Again, printer B executes it own instance of P2P engine 401 and enters "m2mDiscovery" or discovery mode.

During peer list synchronization process 502, printer B queries for active "virtual master" as an attempt to get a token, in which case it enters an "m2mState(I am "virtual master")" state. If no other master is active, an "m2mConnect(dev state="virtual master")" message is sent from printer B to printer A, followed by an m2mReqInfo message requesting a peer list from printer A. Printer A accepts the connection, creates a peer device list (e.g., of other peer printers in network 302) if it does not exist, adds itself to the peer list (e.g., "peerList=[printerA]"}, and stores the list in its local database 403.

Printer A sends a response to printer B with "m2mInfoResp(peerList, timestamp)." If more than one response is received by printer B, it compares the lists' respective timestamps, chooses the most recent list, joins itself to that list, and updates the list with a new time stamp (e.g., "peerList=[PrinterA], PrinterB}"). Then, printer B sends an "m2mUpdateList(peerList, timestamp)" message to printer A, which updates its peer list accordingly (e.g., "peerList=[PrinterA], PrinterB"), and sends an acceptance message "m2mAccepted (peerList, timestamp)"). In return, printer B updates its member list (e.g., "peerList=[PrinterA], PrinterB") and releases "virtual-master" role with an "m2mState(success)" message.

During peer list synchronization 503, both printers A and B remain in "m2mReady" or listener mode.

Figure 6:
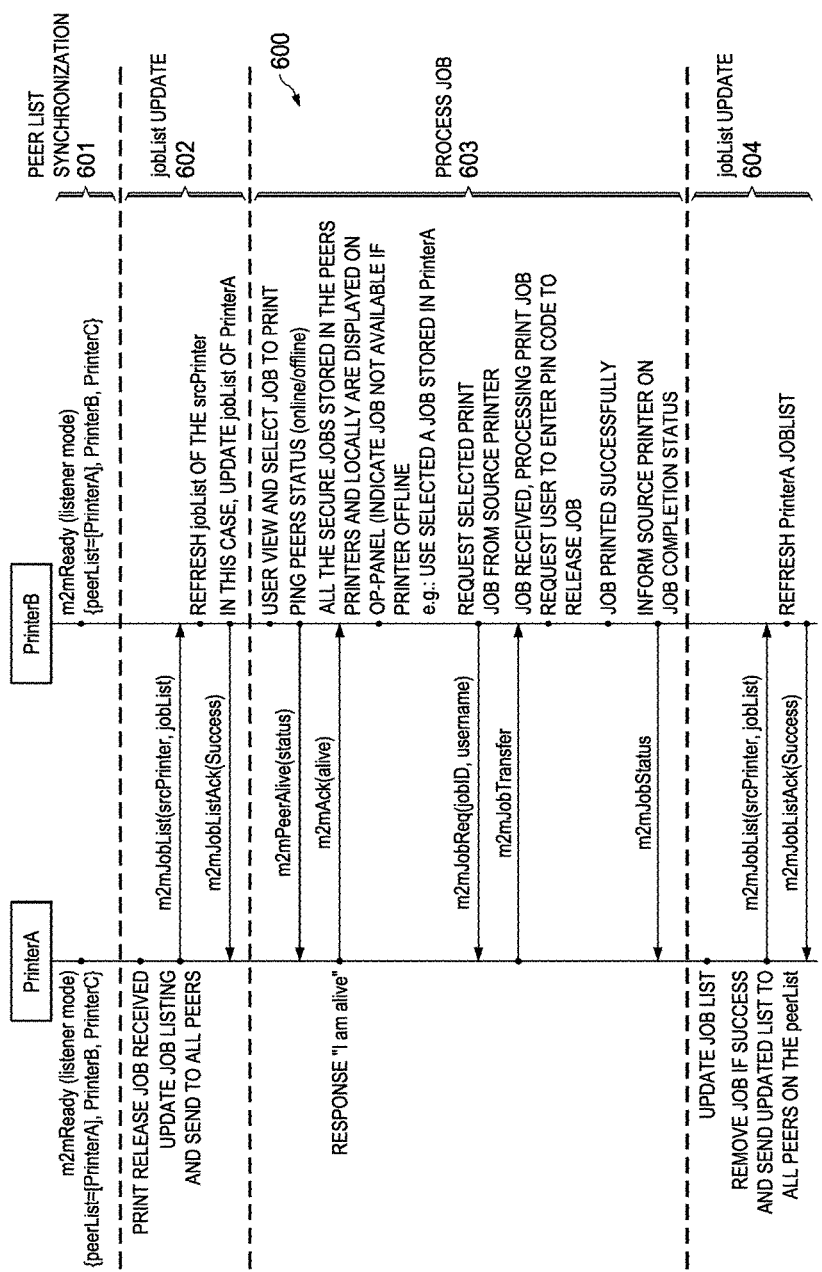
FIG. 6 is a diagram of an example of a method for job list creation and maintenance according to some embodiments.

FIG. 6 is a diagram of an example of method 600 for job list creation and maintenance according to some embodiments. As illustrated, method 600 includes peer list synchronization 601, first print job list update 602, print job processing 603, and second print job list update 604.

As part of peer list synchronization 601, printer A and printer B are both in "m2mReady" or listening mode, and, in this example, the synchronized peer list includes "{peerList=[PrinterA], PrinterB, PrinterC}."

During first print job list update 602, printer A receives a print release job and sends an update job listing to all peers using an "m2mJobList(scrPrinter, jobList)" message. Printer B refreshes the jobList of the source (scr) printer, which in this case updates the job list of Printer A, and returns an "m2mJobListAck(Success)" message to printer A.

As part of print job processing 603, a user views and selects a print job to print at printer B. Printer B pings peer status (e.g., online or offline), and printer A responds with an "I am alive" exchange in the form of "m2mPeerAlive (status)" and "m2mAck(alive)" messages. At this point, all secure jobs stored in peer printers, as well as locally, are displayed on panel 206 (or it indicates that a job is not available if a printer is offline). In this example scenario, the selected job is stored in printer A.

Accordingly, printer B sends a request for the selected print job from the source printer in the form of an "m2mJobReq(jobID, username)", and receives an "m2mJobTransfer" message. In response to receiving the latter, printer B processes the print job, for example, by asking the user to enter a PIN number to release the job. Once the job is successfully completed, printer B sends an "m2mJobStatus" message to printer A to inform the source printer of the job completion status.

Then, during second print job list update 604, printer A updates its job list. For example, it may remove the job from the list if it succeeded, and then it may send an updated list to all peers on the peer list in the form of an "m2mJobList (srcPrinter, jobList)". In some cases, the updated peer list may not be sent from printer A to printer B. Instead, the updated list may be sent to other printers to the exclusion of printer B, and printer B may update its list based on information received from another printer C (e.g., 301N) in the P2P network. Printer B updates the job list of printer A, and sends an "m2mJobListAck(Success)" message to printer A.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

A person of ordinary skill in the art will appreciate that IHS 100 is merely illustrative and is not intended to limit the scope of the disclosure described herein. In other implementations, one or more of the devices or components shown in FIG. 1 may be absent, or one or more other components may be added. Accordingly, systems and methods described herein may be implemented or executed with other IHS configurations.

In particular, any computer system and/or device may include any combination of hardware or software capable of performing certain operations described herein. In addition, the operations performed by the illustrated components may, in some embodiments, be performed by fewer components or distributed across additional components. Similarly, in other embodiments, the operations of some of the illustrated components may not be performed and/or other additional operations may be available.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A printer, comprising:
   a processor; and
   a memory coupled to the processor, the memory having program instructions stored thereon that, upon execution by the processor, cause the printer to:
   assume master status;
   receive a first peer list from a first peer printer;
   receive a second peer list from a second peer printer;
   select a most recent peer list by comparing a first time stamp associated with the first peer list against a second time stamp associated with the second peer list;
   create an updated peer list by adding the printer to the most recent peer list;
   send the updated peer list to the first peer printer;
   receive confirmation that the updated peer list was accepted by the first peer printer; and
   release master status.

2. The printer of claim 1, wherein the send and receive operations are performed over a peer-to-peer network made exclusively of printers, and wherein the peer list includes a list of all other printers in the peer-to-peer network.

3. The printer of claim 1, wherein to assume master status, the program instructions, upon execution, further cause the printer to:
   determine whether the first peer printer has master status; and
   assume master status, at least in part, in response to the first peer printer not having master status.

4. The printer of claim 1, further comprising program instructions that, upon execution, cause the printer to add a time stamp to the updated peer list.

5. The printer of claim 1, further comprising program instructions that, upon execution, cause the printer to:
   maintain a local job list including a print job stored locally in the printer; and
   maintain a remote job list including print jobs stored locally in other peer printers.

6. The printer of claim 5, further comprising program instructions that, upon execution, cause the printer to:
   receive a copy of a first local job list from the first peer printer, wherein the first local job list includes a print job stored locally in the first peer printer; and
   update the remote job list with the given print job from the first job list.

7. The printer of claim 5, further comprising program instructions that, upon execution, cause the printer to: in response to running out of available memory for an additional print job, directly send the additional print job to a selected one of the first and second peer printers in the absence of any involvement by any print server.

8. The printer of claim 7, wherein to select between the first and second peer printers, the program instructions, upon execution, cause the printer to determine which of the first or second peer printer has more available memory.

9. The printer of claim 7, wherein to determine which of the first or second peer printer has more available memory, the program instructions, upon execution, cause the printer to determine the available memory of each peer printer based upon the remote job list.

10. The printer of claim 7, wherein to determine which of the first or second peer printer has more available memory, the program instructions, upon execution, cause the printer to send an inquiry to each peer printer.

11. The printer of claim 5, further comprising program instructions that, upon execution, cause the printer to:
- receive an additional print job having a particular characteristic; and
- autonomously select a most used peer printer for the particular characteristic in the absence of user selection.

12. The printer of claim 11, further comprising program instructions that, upon execution, cause the printer to:
- offload the additional print job to the most used peer printer prior to running out of available memory.

13. The printer of claim 11, wherein the characteristic is selected from the group consisting of: a physical location relative to a user, a minimum number of pages for a single document, a maximum number of pages for a single document, a color document, and a grayscale document.

14. The printer of claim 1, wherein the sending, receiving, creating, sending, receiving, and releasing take place upon the printer entering a peer-to-peer mode and wherein the program instructions, upon execution, further cause the printer to enter the peer-to-peer mode in response to a print server going offline.

15. The printer of claim 14, wherein the program instructions, upon execution, further cause the printer to leave the peer-to-peer mode in response to the print server going online.

16. A method for operating a printer, the method comprising:
- assuming master status;
- receiving a first peer list from a first peer printer;
- receiving a second peer list from a second peer printer;
- selecting a most recent peer list by comparing a first time stamp associated with the first peer list against a second time stamp associated with the second peer list;
- creating an updated peer list by adding the printer to the most recent peer list;
- sending the updated peer list to the first peer printer;
- receiving confirmation that the updated peer list was accepted by the first peer printer; and
- releasing master status.

17. The method of claim 16, further comprising:
- maintaining a local job list including a print job stored locally in the printer;
- maintaining a remote job list including print jobs stored locally in other peer printers;
- receiving a copy of a first local job list from the first peer printer, wherein the first local job list includes a print job stored locally in the first peer printer; and
- updating the remote job list with the given print job from the first job list.

18. A memory storage device having program instructions stored thereon that, upon execution by a processor of a printer, cause the printer to:
- assume master status;
- receive a first peer list from a first peer printer;
- receive a second peer list from a second peer printer;
- select a most recent peer list by comparing a first time stamp associated with the first peer list against a second time stamp associated with the second peer list;
- create an updated peer list by adding the printer to the most recent peer list;
- send the updated peer list to the first peer printer;
- receive confirmation that the updated peer list was accepted by the first peer printer; and
- release master status.

19. The memory storage device of claim 18, further comprising program instructions that, upon execution, cause the printer to:
- maintain a local job list including a print job stored locally in the printer;
- maintain a remote job list including print jobs stored locally in other peer printers;
- receive a copy of a first local job list from the first peer printer, wherein the first local job list includes a print job stored locally in the first peer printer; and
- update the remote job list with the given print job from the first job list.

* * * * *